United States Patent
Lee et al.

(10) Patent No.: US 9,651,727 B2
(45) Date of Patent: May 16, 2017

(54) POLARIZER, POLARIZED LIGHT ILLUMINATING APPARATUS HAVING THE SAME AND METHOD OF MANUFACTURING THE SAME

(71) Applicant: Samsung Display Co., LTD., Yongin, Gyeonggi-Do (KR)

(72) Inventors: Dae-Young Lee, Seoul (KR); Jung-Gun Nam, Seoul (KR); Yeon-Jae Lee, Suwon-si (KR); Dae-Hwan Jang, Gwangmyeong-si (KR); Gug-Rae Jo, Asan-si (KR)

(73) Assignee: Samsung Display Co., Ltd. (KR)

( * ) Notice: Subject to any disclaimer, the term of this patent is extended or adjusted under 35 U.S.C. 154(b) by 280 days.

(21) Appl. No.: 14/287,766

(22) Filed: May 27, 2014

(65) Prior Publication Data

US 2015/0009564 A1 Jan. 8, 2015

(30) Foreign Application Priority Data

Jul. 4, 2013 (KR) ........................ 10-2013-0078385

(51) Int. Cl.
*G02B 5/30* (2006.01)
*G02B 1/12* (2006.01)

(52) U.S. Cl.
CPC ............. *G02B 5/3058* (2013.01); *G02B 1/12* (2013.01)

(58) Field of Classification Search
None
See application file for complete search history.

(56) References Cited

U.S. PATENT DOCUMENTS

| | | | |
|---|---|---|---|
| 6,243,199 B1 | 6/2001 | Hansen et al. | |
| 7,221,420 B2 | 5/2007 | Silverstein et al. | |
| 7,463,418 B2 | 12/2008 | Shioya | |
| 7,746,425 B2 | 6/2010 | Atsushi et al. | |
| 2004/0070829 A1* | 4/2004 | Kurtz ................... | G02B 5/3058 359/485.05 |
| 2005/0277063 A1* | 12/2005 | Wang ................... | G02B 5/1857 430/311 |
| 2008/0037101 A1 | 2/2008 | Jagannathan et al. | |
| 2009/0041971 A1* | 2/2009 | Wang ................... | G02B 5/1809 428/54 |
| 2012/0183739 A1 | 7/2012 | Kim et al. | |
| 2013/0300986 A1* | 11/2013 | Kang ................... | G02B 5/3058 349/96 |

FOREIGN PATENT DOCUMENTS

| | | |
|---|---|---|
| JP | 2002-328234 | 11/2002 |
| JP | 2007-114647 | 5/2007 |
| JP | 2010-091906 | 4/2010 |
| JP | 2010091906 A * | 4/2010 |
| JP | 2011-053584 | 3/2011 |

(Continued)

*Primary Examiner* — Derek S Chapel
(74) *Attorney, Agent, or Firm* — Innovation Counsel LLP

(57) ABSTRACT

A polarizer includes a base substrate and a metal pattern disposed on the base substrate and forming a wire grid. The wire grid has a width and a height and spaced apart from adjacent wire grid by a separation distance. A pitch is a sum of the width and the separation distance. A fill factor is obtained by dividing the width by the pitch. The range of the fill factor is based on an extinction ratio of polarization and a transmittance of the polarizer.

4 Claims, 11 Drawing Sheets

(56) References Cited

FOREIGN PATENT DOCUMENTS

| | | |
|---|---|---|
| JP | 2012-145938 | 8/2012 |
| KR | 1020010053484 A | 6/2001 |
| KR | 1020050067801 A | 7/2005 |
| KR | 1020060053118 A | 5/2006 |
| KR | 1020090112546 A | 10/2009 |
| KR | 101040740 B1 | 6/2011 |
| KR | 1020110083496 A | 7/2011 |
| KR | 1020110125858 A | 11/2011 |
| KR | 1020120080802 A | 7/2012 |
| KR | 1020130001911 A | 1/2013 |

* cited by examiner

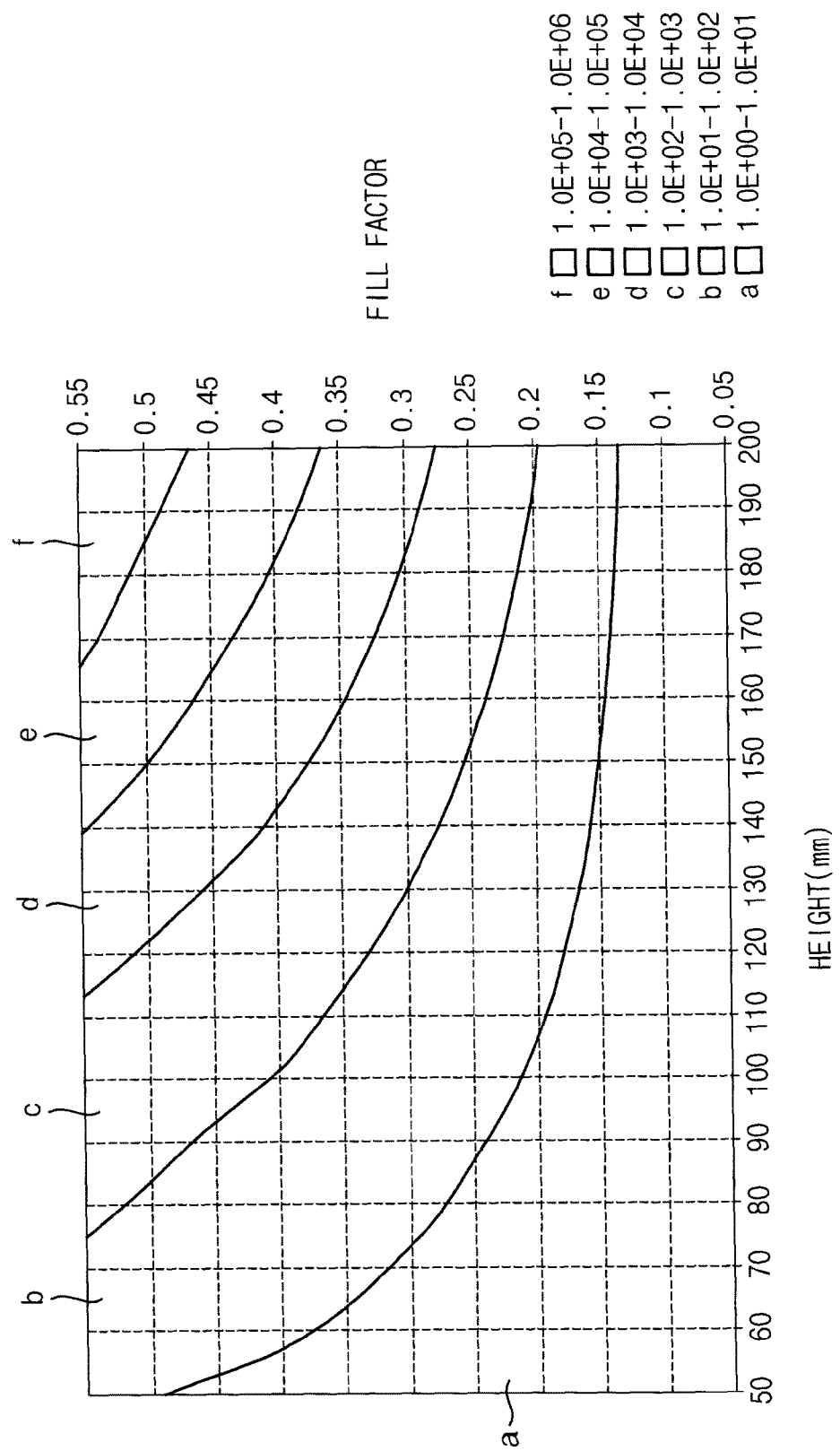

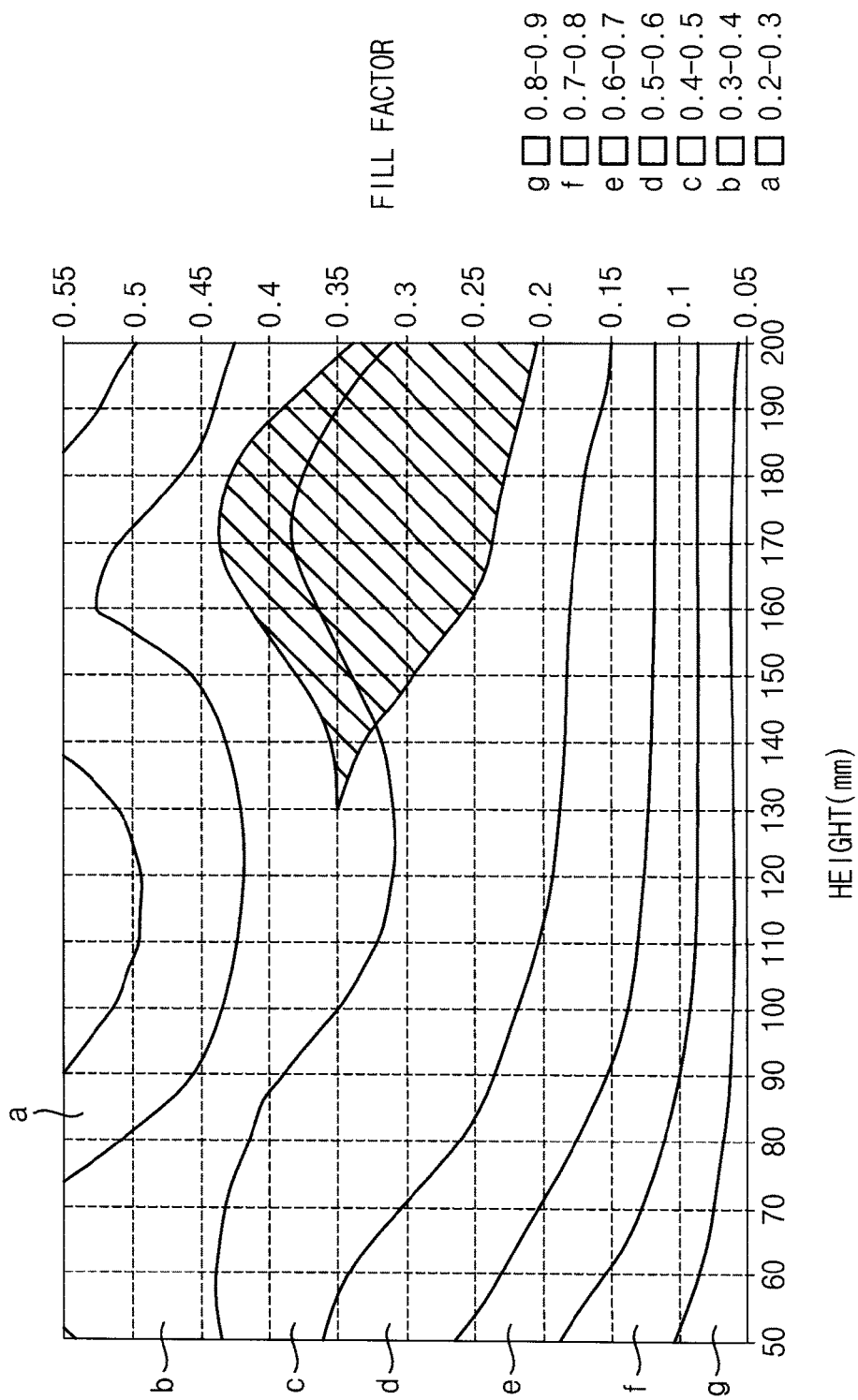

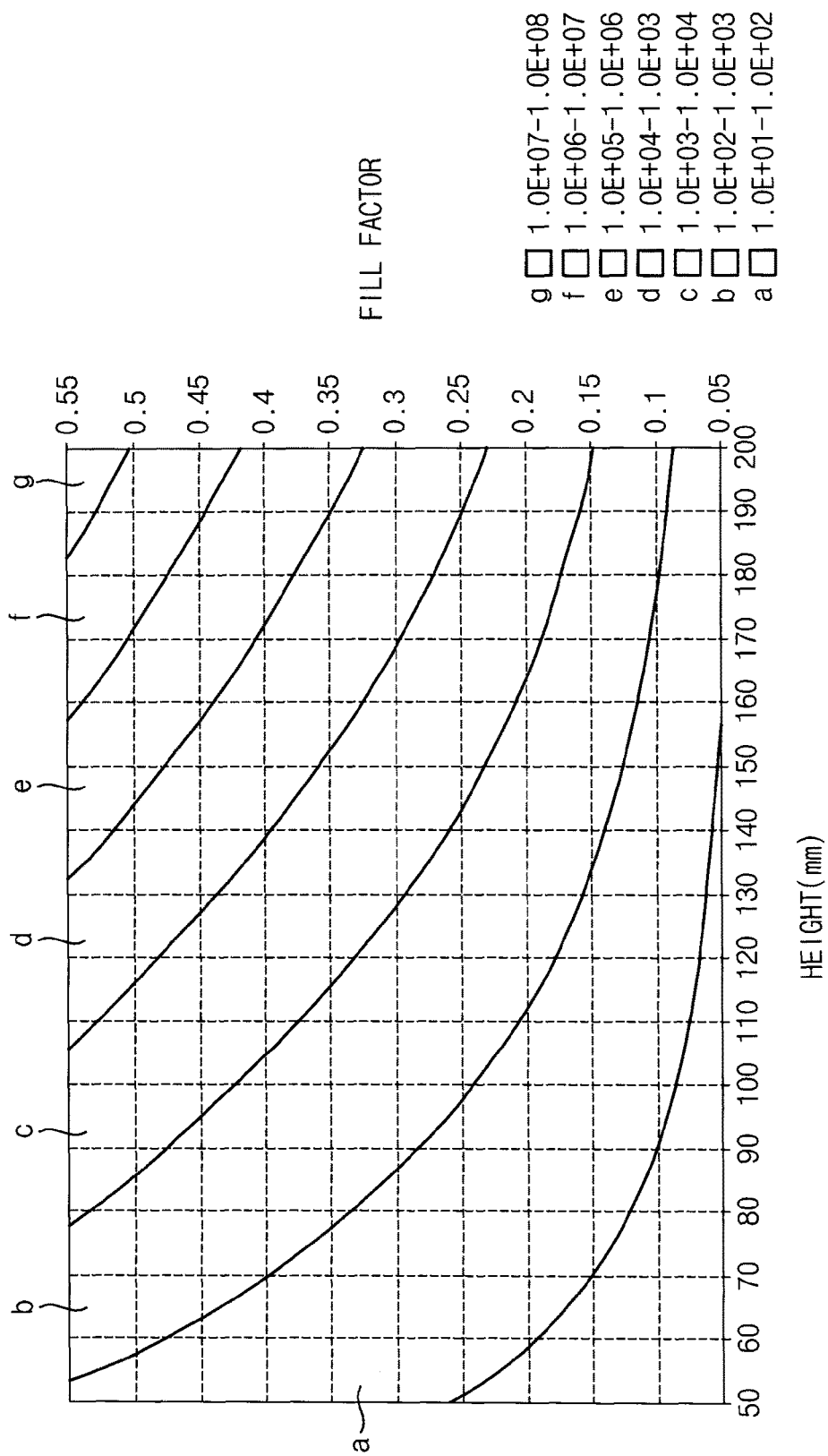

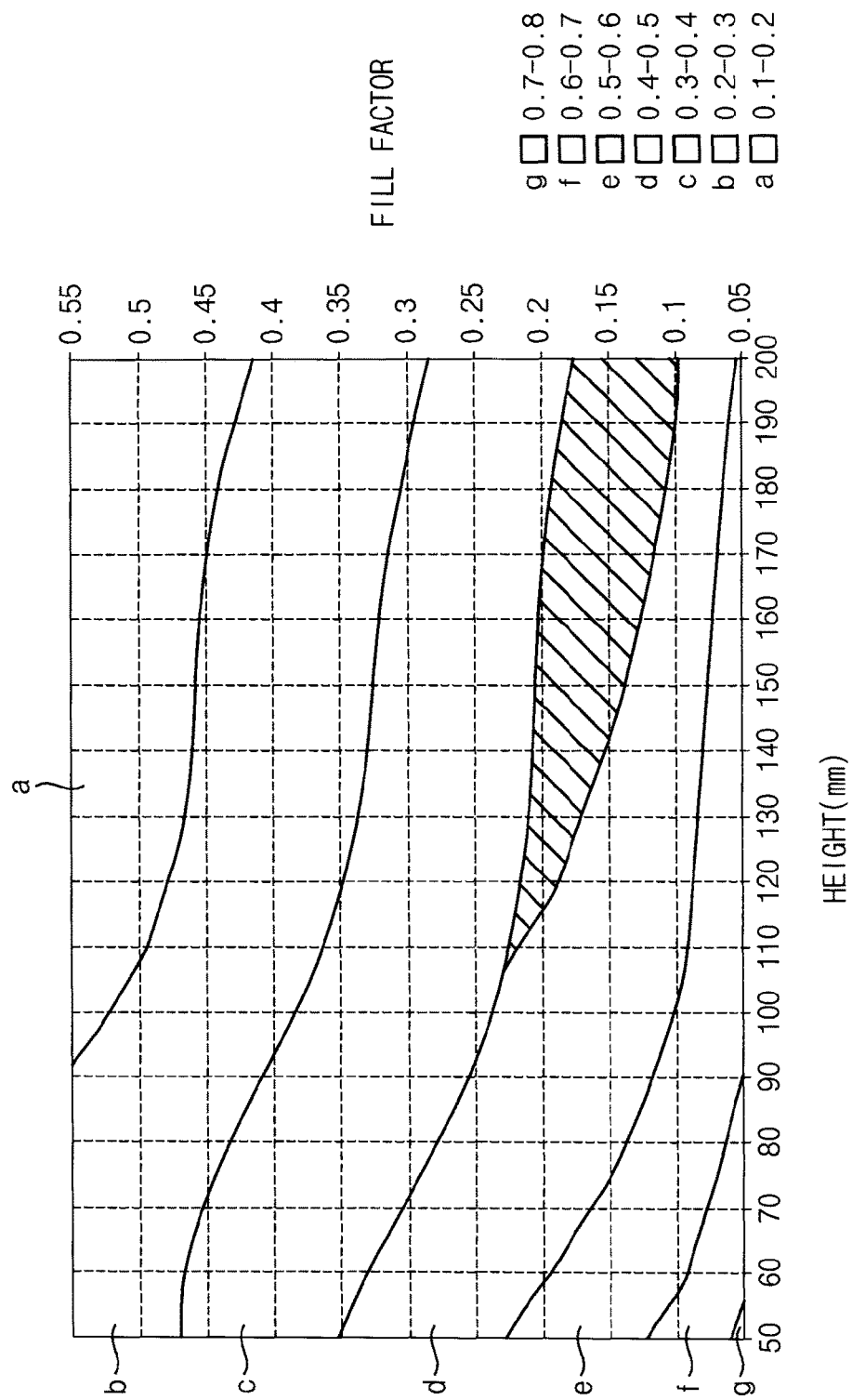

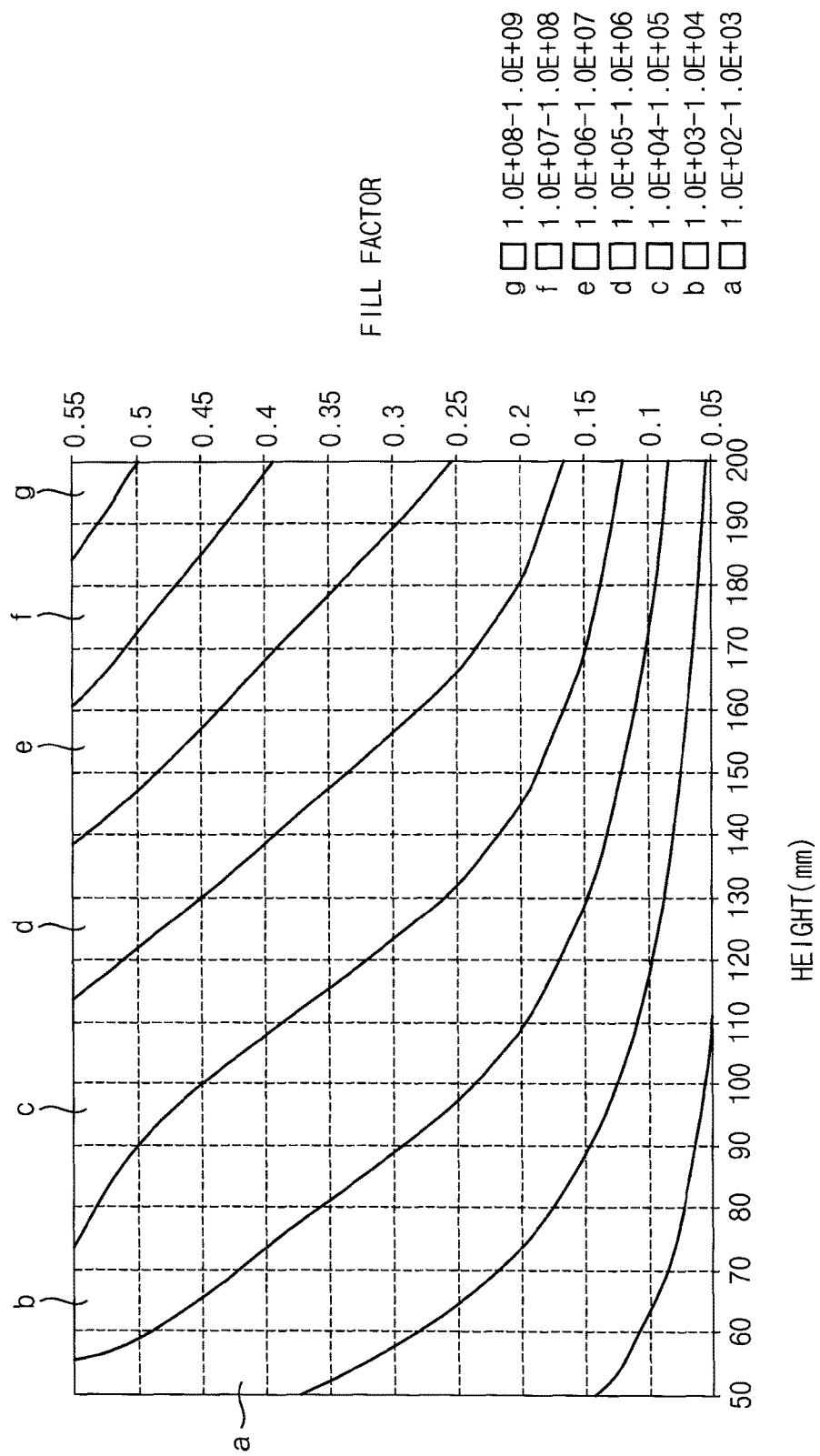

POLARIZER, POLARIZED LIGHT ILLUMINATING APPARATUS HAVING THE SAME AND METHOD OF MANUFACTURING THE SAME

This application claims priority to Korean Patent Application No. 10-2013-0078385 filed on Jul. 4, 2013, the contents of which are incorporated by reference herein in its entirety. This application also claims the benefit of the above Korean Patent Application under 35 U.S.C. §119.

BACKGROUND

1. Field

The disclosure relates to a polarizer, a polarized light illuminating apparatus having the polarizer, and a method of manufacturing the polarizer.

More particularly, the disclosure relates to a polarizer of a polarized light illuminating apparatus for manufacturing a liquid crystal display, the polarized light illuminating apparatus having the polarizer, and a method of manufacturing the polarizer.

2. Description of the Related Art

Recently, liquid display apparatuses have become a mainstream display device due to advantages such as light weight and small size. Previously, cathode ray tube (CRT) display apparatuses were frequently used due to their reliable performance and competitive price. However, as CRT display apparatuses tend to be cumbersomely large and heavy, they are not well-suited for portable devices. The market demand for portability drove the shift from CRT to liquid crystal display apparatuses as the mainstream display devices. Unlike CRT displays, liquid crystal displays offer small size, light weight and low-power-consumption.

A liquid crystal display apparatus applies a voltage to specific molecular arrangement configured to change the molecular arrangement. The liquid display apparatus displays an image using changes of optical properties (for example, birefringence, rotatory polarization, dichroism and light scattering) of a liquid crystal cell according to the changes of the molecular arrangement.

The liquid crystal display apparatus includes an alignment layer aligning liquid crystal molecules. Photo alignment may be used to align the liquid crystal molecules by irradiating them with polarized light having a specific wavelength. A polarized light illuminating apparatus including a polarizer may be used to generate the polarized light. However, a traditional polarized light illuminating apparatus may reduce the transmittance to improve an extinction ratio of polarization. In addition, it is desirable to reduce the process time and cost associated with a traditional polarized light illuminating apparatus.

SUMMARY

One or more exemplary embodiments provide a polarizer capable of improving transmittance.

One or more exemplary embodiments also provide a polarized light illuminating apparatus having the polarizer, One or more exemplary embodiments also provide a method of manufacturing the polarizer.

In one aspect, a polarizer for polarizing light of a known wavelength includes a base substrate and a metal pattern disposed on the base substrate and forming a wire grid. The wire grid has a width and a height, is spaced apart from an adjacent wire grid by a separation distance, and has a fill factor that falls within a range that is based on an extinction ratio of polarization and a transmittance of the polarizer. The fill factor is obtained by dividing the width by a pitch. A pitch is defined sum of the width and the separation distance.

The polarizer may have a pitch that is about ⅓ of the wavelength of the light.

The polarizer may be irradiated by ultraviolet ray that has a wavelength less than about 300 nm.

The pitch of the wire grid may be less than 90 nm.

The metal pattern may be formed of aluminum (Al). The fill factor may be about 0.2 to about 0.4.

The height of the wire grid may be about 130 nm to about 200 nm.

The metal pattern may be formed of molybdenum (Mo). The fill factor may be about 0.1 to about 0.2.

The height of the wire grid may be about 100 nm to 200 nm.

The metal pattern may be formed of tungsten (W). The fill factor may be about 0.05 to about 0.15.

In an exemplary embodiment, the height of the wire grid may be about 70 nm to about 200 nm.

In another aspect, a polarized light illuminating apparatus includes a light source generating light having a wavelength less than about 300 nm, a light source cover surrounding the light source except for a bottom portion of the light source, and reflecting the light from the light source, a work stage disposed under the light source, and a polarizer disposed between the light source and the work stage. A display panel having an alignment layer for photo alignment is disposed on the work stage. The polarizer includes a base substrate and a metal pattern disposed on the base substrate and forming a wire grid. The wire grid has a width and a height and spaced apart from adjacent wire grid by a separation distance. A pitch is defined sum of the width and the separation distance. A fill factor is defined a result of dividing the width by the pitch. The range of the fill factor is based on an extinction ratio of polarization and a transmittance of the polarizer.

The metal pattern of the polarizer may include one of aluminum (Al), molybdenum (Mo) and tungsten (W).

The pitch of the wire grid may be less than 90 nm.

The metal pattern may be formed of aluminum (Al). The fill factor may be about 0.2 to about 0.4. The height of the wire grid may be about 130 nm to about 200 nm.

In an exemplary embodiment, the metal pattern may be formed of molybdenum (Mo).

The fill factor may be about 0.1 to about 0.2. The height of the wire grid may be about 100 nm to about 200 nm.

In an exemplary embodiment, the metal pattern may be formed of tungsten (W). The fill factor may be about 0.05 to about 0.15. The height of the wire grid may be about 70 nm to about 200 nm.

According to another exemplary embodiment of the invention, a method of manufacturing a polarizer includes forming a metal layer having a height on a base substrate; forming a resist layer comprising a grid having a width, a separation distance and a pitch; partially removing the resist layer to form a resist pattern partially exposing the metal layer; forming a metal pattern by removing an exposed portion of the metal layer using the resist pattern as a mask; and removing the resist pattern to form the metal pattern into a wire grid. The pitch is defined sum of the width and the separation distance. The fill factor is defined a result of dividing the width by the pitch. The range of the fill factor is based on an extinction ratio of polarization and a transmittance of the polarizer.

In an exemplary embodiment, in forming the metal layer, the metal pattern may include one of aluminum (Al), molybdenum (Mo) and tungsten (W).

In an exemplary embodiment, the pitch may be about 1/3 of a wavelength of light that irradiates the polarizer.

In an exemplary embodiment, when the metal pattern is formed of aluminum (Al), the fill factor may be about 0.2 to about 0.4, and the height of the wire grid may be about 130 nm to 200 nm. When the metal pattern is formed of molybdenum (Mo), the fill factor may be about 0.1 to about 0.2, and the height of the wire grid may be about 100 nm to 200 nm. When the metal pattern is formed of tungsten (W), the fill factor may be about 0.05 to about 0.15, and the height of the wire grid may be about 70 nm to 200 nm.

According to the present invention, the polarizer may have optimized extinction ratio of polarization and transmittance.

In addition, the polarized light illuminating apparatus may be used to manufacture a liquid crystal display panel. The polarized light illuminating apparatus uses the polarizer which has improved transmittance, so that manufacturing time and power consumption of the liquid crystal display panel may be decreased.

BRIEF DESCRIPTION OF THE DRAWINGS

The above and other features of the invention will become more apparent by describing in detail exemplary embodiments thereof with reference to the accompanying drawings, in which:

FIGS. 4A and 4B are graphs about a fill factor and a height for optimizing an extinction ratio of polarization and transmittance when a wire grid of the polarizer of FIG. 2 is formed of aluminum;

FIGS. 5A and 5B are graphs about a fill factor and a height for optimizing an extinction ratio of polarization and transmittance when a wire grid of the polarizer of FIG. 2 is formed of molybdenum;

FIGS. 6A and 6B are graphs about a fill factor and a height for optimizing an extinction ratio of polarization and transmittance when a wire grid of the polarizer of FIG. 2 is formed of tungsten;

DETAILED DESCRIPTION OF EXAMPLE EMBODIMENTS

Hereinafter, the invention will be explained in detail with reference to the accompanying drawings.

Figure 1:
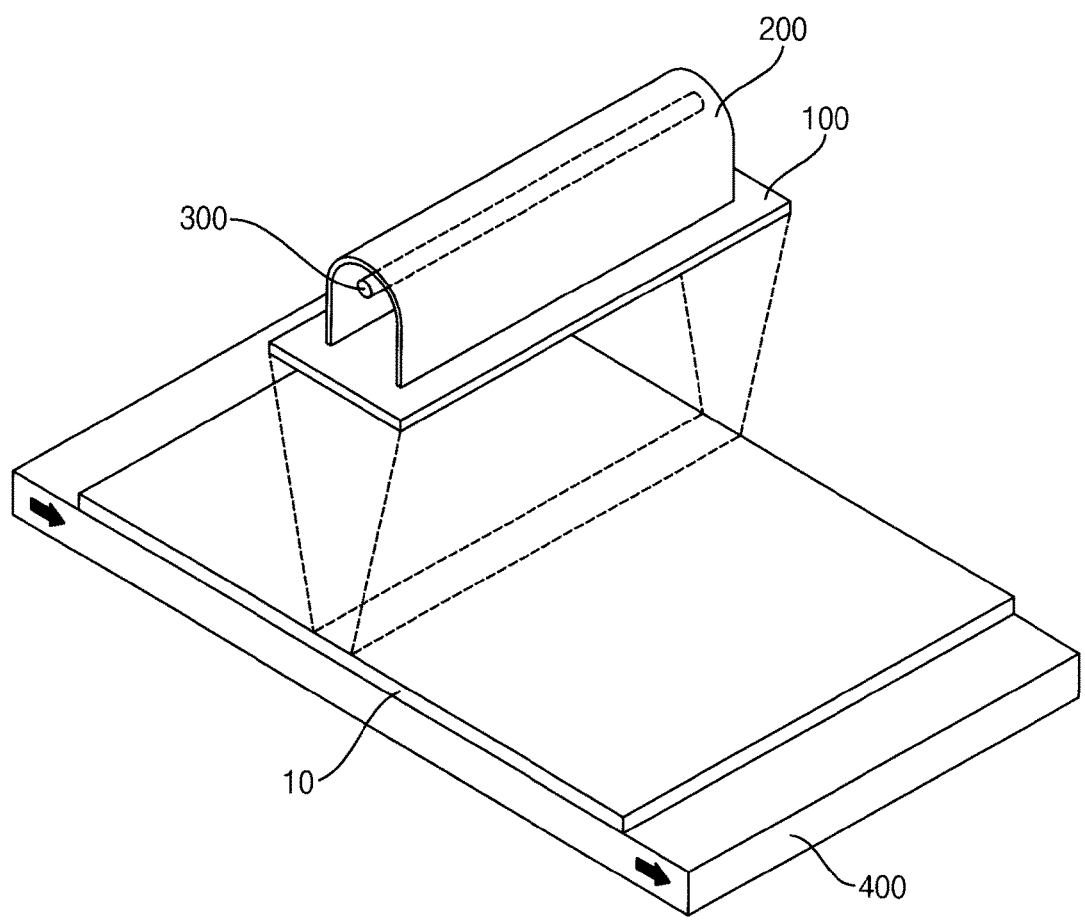
FIG. 1 is a perspective view briefly illustrating a polarized light illuminating apparatus according to an exemplary embodiment of the invention.

FIG. 1 is a perspective view briefly illustrating a polarized light illuminating apparatus according to an exemplary embodiment of the invention.

Referring to FIG. 1, a polarized light illuminating apparatus includes a polarizer 100, a light source cover 200, a light source 300 and a work stage 400.

The light source 300 generates light. The light is supplied to a display panel 10 (or display substrate), which is disposed on the work stage 400 and includes an alignment layer, through the polarizer 100. The light source 300 may be a line source. The light source 300 may irradiate ultraviolet ray to the alignment layer of the display panel 10 for photo alignment. The light source 300 may generate light having a wavelength less than about 300 nm. For example, the light source 300 may generate light having a wavelength of about 255 nm. For example, the light source 300 may be a high pressure mercury lamp having a cylindrical shape, a metal halide lamp, or a plurality of light emitting diodes (LED) or laser diodes (LD) arranged in a line that generate ultraviolet rays.

The polarizer 100 is disposed under the light source 300. The polarizer 100 changes the light from the light source 300 to polarized light. The polarizer 100 may be a wire grid polarizer. Detailed explanation about the wire grid polarizer will be mentioned in FIG. 2.

The light source cover 200 surrounds the light source 300. The light source cover 200 surrounds the light source 300 except for a bottom portion of the light source 300, so that the light from the light source 300 may reach the alignment layer of the display panel 10 which is on the work stage 400. An inner surface of the light source cover 200 may include material having relatively high reflectance, and reflect the light from the light source 300 toward the display panel 10 on the work stage 400. Thus, the light from the light source 300 directly passes the polarizer 100, and reaches the alignment layer of the display panel 10 on the work stage 400. In addition, the light from the light source 300 reflects off the inner surface of the light source cover 200, passes the polarizer 100, and reaches the alignment layer of the display panel 10 on the work stage 400.

The work stage 400 is disposed under the light source 300 and the polarizer 100. An object may be laid on the work stage 400 to receive the polarized light. For example, the display panel 10 having an alignment layer for a photo alignment may be disposed on the work stage 400. The work stage 400 transports the display panel 10 in the direction shown by the arrows in FIG. 1, so that the whole display panel 10 may be irradiated by the light source 300, which is a line source.

Figure 2:
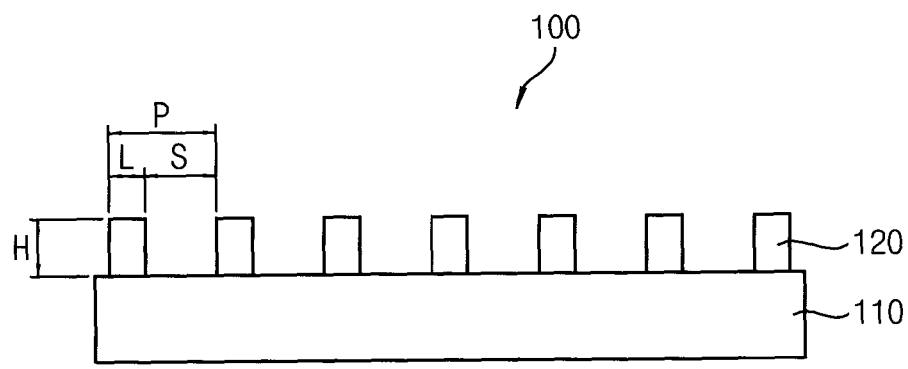
FIG. 2 is a cross-sectional view of a polarizer of the polarized light illuminating apparatus of FIG. 1.

FIG. 2 is a cross-sectional view of a polarizer of the polarized light illuminating apparatus of FIG. 1.

Referring to FIG. 2, a polarizer 100 includes a base substrate 110 and a metal pattern 120.

The base substrate 110 may include a material which has relatively high transmittance, thermal resistance, and chemical resistance. For example the base substrate 110 may include any one selected from the group consisting of glass, polyethylene naphthalate, polyethylene terephthalate, polyacryl and a mixture thereof.

The metal pattern 120 forms a plurality of wire grids extending in a direction. The wire grid has a height H and a width L. Adjacent wire grids are spaced apart by a separation distance S. Thus, the metal pattern 120 forms the wire grids having the height H, the width L and a pitch P, which is the sum of the width L and the separation distance S (P=L+S).

The metal pattern 120 may include one of aluminum (Al), molybdenum (Mo) and tungsten (W).

The pitch P is sum of the width L and the separation distance S. A fill factor (FF) is a result of dividing the width L by the pitch P (FF=L/P). The height H and the fill factor of the wire grid may have an optimized range according to a material of the metal pattern 120. The optimized range may be determined based on the extinction ratio and transmittance of the polarizer 100. In one embodiment, the metal pattern includes a plurality of wire grids that are arranged regularly across the base substrate, with a substantially consistent width L, separation distance S, height H, and pitch P.

When the metal pattern 120 is formed of aluminum (Al), the height H of the wire grids may be about 130 nm to about 200 nm, and the fill factor of the wire grids may be about 0.2 to about 0.4. In this case, the pitch P may be determined based on the wavelength of the light that is supplied to the polarizer 100. The pitch P may preferably be about ⅓ of the wavelength of the light. For example, when the light has wavelength of about 255 nm, the pitch P may be about 90 nm.

When the metal pattern 120 is formed of molybdenum (Mo), the height H of the wire grids may be about 100 nm to about 200 nm, and the fill factor of the wire grids may be about 0.1 to about 0.2. In this case, the pitch P may be determined regarding wavelength of light which supplied to the polarizer 100. The pitch P may preferably be about ⅓ of the wavelength of the light. For example, when the light has wavelength of about 255 nm, the pitch P may be about 90 nm.

When the metal pattern 120 is formed of tungsten (W), the height H of the wire grids may be about 70 nm to about 200 nm, and the fill factor of the wire grids may be about 0.05 to about 0.15. In this case, the pitch P may be determined based on the wavelength of the light that is supplied to the polarizer 100. The pitch P may preferably be about ⅓ of the wavelength of the light. For example, when the light has wavelength of about 255 nm, the pitch P may be about 90 nm.

FIGS. 3A to 3E are cross-sectional views illustrating a method of the polarizer of FIG. 2.

Figure 3A:
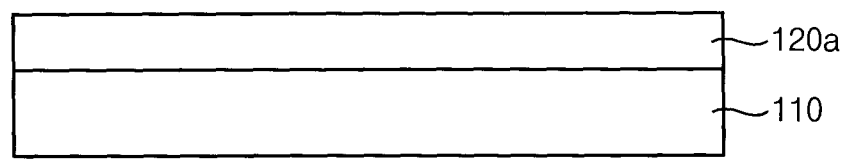
FIGS. 3A to 3E are cross-sectional views illustrating a method of the polarizer of FIG. 2.

Referring to FIG. 3A, a metal layer 120a is formed on a base substrate 110. The base substrate 110 may include a material that has a relatively high transmittance, thermal resistance, and chemical resistance. For example the base substrate 110 may include any one selected from the group consisting of glass, polyethylene naphthalate, polyethylene terephthalate, polyacryl and a mixture thereof.

The metal layer 120a may be formed of one of aluminum (Al), molybdenum (Mo) and tungsten (W). The metal layer 120a may be formed on the base substrate 110 by a deposition process. For example, the metal layer 120a may be formed on the base substrate 110 by a sputtering process.

A thickness of the metal layer 120a may have an optimized range according to a material of the metal layer 120a. The optimized range may be determined based on the extinction ratio and transmittance of the polarizer 100.

When the metal layer 120a is formed of aluminum (Al), the thickness of the metal layer 120a may be about 130 nm to about 200 nm, When the metal layer 120a is formed of molybdenum (Mo), the thickness of the metal layer 120a may be about 100 nm to about 200 nm.

When the metal layer 120a is formed of tungsten (W), the thickness of the metal layer 120a may be about 70 nm to about 200 nm.

Figure 3B:
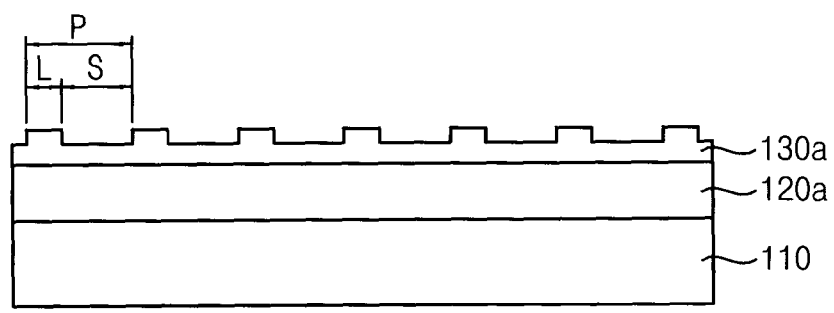

Referring to FIG. 3B, a resist layer 130a including a plurality of grids having a width L, a separation distance S and a pitch P is formed on the metal layer 120a. The grid has the width L. Adjacent grids are spaced apart by the separation distance S. Thus, the resist layer 130a includes protrusions and grooves between the protrusions which form the grids.

The pitch P is a sum of the width L and the separation distance S. A fill factor (FF) is a result of dividing the width L by the pitch P (FF=L/P). The height H and the fill factor of the wire grid may have an optimized range according to a material of the metal layer 120a. The optimized range may be determined based on the extinction ratio and transmittance of the polarizer 100.

When the metal layer 120a is formed of aluminum (Al), the height H of the wire grids may be about 130 nm to about 200 nm, and the fill factor of the wire grids may be about 0.2 to about 0.4. In this case, the pitch P may be determined based on the wavelength of the light that is supplied to the polarizer 100. The pitch P may preferably be about ⅓ of the wavelength of the light. For example, when the light has a wavelength of about 255 nm, the pitch P may be about 90 nm.

When the metal layer 120a is formed of molybdenum (Mo), the height H of the wire grids may be about 100 nm to about 200 nm, and the fill factor of the wire grids may be about 0.1 to about 0.2. In this case, the pitch P may be determined based on the wavelength of the light that is supplied to the polarizer 100. In some embodiments, the pitch P may be about ⅓ of the wavelength of the light. For example, when the light has wavelength of about 255 nm, the pitch P may be about 90 nm.

When the metal layer 120a is formed of tungsten (W), the height H of the wire grids may be about 70 nm to about 200 nm, and the fill factor of the wire grids may be about 0.05 to about 0.15. In this case, the pitch P may be determined regarding wavelength of light which supplied to the polarizer 100. In some embodiments, the pitch P may be about ⅓ of the wavelength of the light. For example, when the light has a wavelength of about 255 nm, the pitch P may be about 90 nm.

Figure 3C:
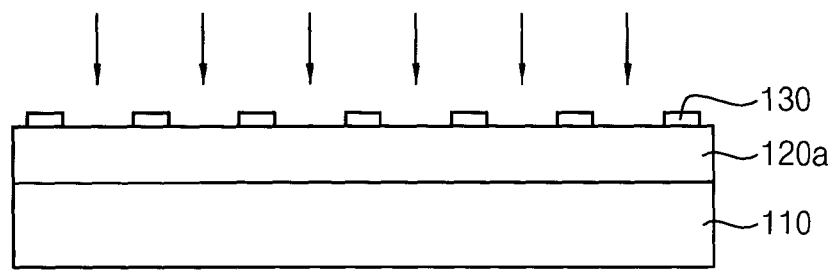

Referring to FIG. 3C, a resist pattern 130 is formed by removing a portion of the resist layer 130a and leaving the protrusions that form the grids. Thus, the resist pattern may expose a portion of the metal layer 120a. The resist layer 130a may be formed into the resist pattern 130 by dry etching. The resist layer 130a and the resist pattern 130 may be formed by various method such as etching or nano-imprint method.

Exposed portion of the metal layer 120a is removed using the resist pattern 130 as a mask. For example, a wire grid corresponding to the resist pattern 130 may be formed by etching the metal layer 120a.

Figure 3D:
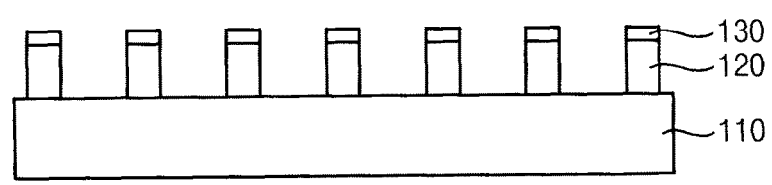

Referring to FIG. 3D, the metal layer 120a is etched to be formed into a metal pattern 120. The metal pattern 120 may have a thickness same as the thickness of the metal layer 120a. The metal pattern 120 has a width, a separation distance and a pitch substantially same as the width L, the separation distance S and the pitch P of the grids of the resist layer 130a.

Figure 3E:
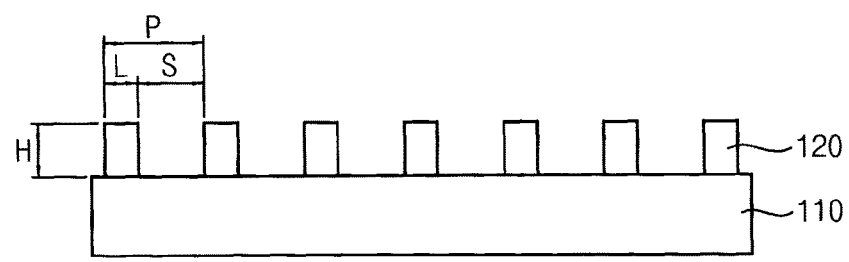

Referring to FIG. 3E, a polarizer having the metal pattern 120 on the base substrate 110 may be manufactured by removing the resist pattern 130 on the metal pattern 120.

The metal pattern 120 forms a plurality of wire grids extending in a direction. The wire grid has a height H and a width L. Adjacent wire grids are spaced apart by a separation distance S. Thus, the metal pattern 120 forms the wire grids having the height H, the width L and a pitch P which is sum of the width L and the separation distance S(P=L+S).

FIGS. 4A and 4B are graphs about a fill factor and a height for optimizing an extinction ratio of polarization and transmittance (hatched line area) when a wire grid of the polarizer of FIG. 2 is formed of aluminum (Al). The light supplied to the polarizer in the present example embodiment may have wavelength of about 255 nm.

Referring to FIG. 4A, the graph represents the extinction ratio of polarization according to the fill factor and the height.

A metal pattern of the polarizer (refers to 120 of FIG. 2) forms a plurality of wire grids extending in a direction. The wire grid has a height (refers to "H" of FIG. 2) and a width (refers to "L" of FIG. 2). Adjacent wire grids are spaced apart by a separation distance (refers to "S" of FIG. 2). Thus, the metal pattern 120 forms the wire grids having the height H, the width L and a pitch P which is sum of the width L and the separation distance S(P=L+S). The metal pattern 120 is formed of aluminum (Al).

The pitch P is a sum of the width L and the separation distance S. A fill factor (FF) is a result of dividing the width L by the pitch P (FF=L/P). The pitch P may be determined considering the wavelength of light which is supplied to the polarizer. For example, when the light has wavelength less than about 300 nm, the pitch P may be less than about 90 nm.

The x-axis represents the height H of the metal pattern 120, and the y-axis represents the fill factor.

The extinction ratio of polarization may be expressed as alphabets on the graph. The extinction ratio of polarization may increase moving toward the upper-right corner of the graph, generally.

Referring to FIG. 4B, the graph represents the transmittance according to the fill factor and the height. The x-axis represents the height H of the metal pattern 120, and the y-axis represents the fill factor.

The transmittance may be expressed as alphabets on the graph. The transmittance may increase moving toward the bottom-left corner of the graph, generally. An optimized range may be determined based on the extinction ratio of polarization of FIG. 4A and the transmittance of FIG. 4B (the area indicated by hatched lines).

The height H may be about 130 nm to about 200 nm. The fill factor of the wire grid may be about 0.2 to about 0.4.

FIGS. 5A and 5B are graphs showing how a fill factor changes with height when optimizing an extinction ratio of polarization and transmittance (hatched line area) in the case where a wire grid of the polarizer as shown in FIG. 2 is formed of molybdenum (Mo). The light supplied to the polarizer in the present example embodiment may have a wavelength of about 255 nm.

Referring to FIG. 5A, the graph represents the extinction ratio of polarization according to fill factor and height.

A metal pattern of the polarizer (reference numeral 120 of FIG. 2) forms a plurality of wire grids extending in a same direction. The wire grid has a height (referring "H" of FIG. 2) and a width (referring to "L" of FIG. 2). Adjacent wire grids are spaced apart by a separation distance (referring to "S" of FIG. 2). Thus, the metal pattern 120 forms the wire grids having the height H, the width L and a pitch P, which is the sum of the width L and the separation distance S (P=L+S). The metal pattern 120 is formed of molybdenum (Mo).

The pitch P is a sum of the width L and the separation distance S. A fill factor (FF) is a result of dividing the width L by the pitch P (FF=L/P). The pitch P may be determined by taking into account the wavelength of the light that is supplied to the polarizer. For example, when the light has wavelength less than about 300 nm, the pitch P may be less than about 90 nm.

The x-axis represents the height H of the metal pattern 120, and the y-axis represents the fill factor.

The extinction ratios of polarization may be expressed with alphabets on the graph. The extinction ratio of polarization may increase toward upper-right of the graph, generally.

Referring to FIG. 5B, the graph represents the transmittance as a function of fill factor and height. The x-axis represents the height H of the metal pattern 120, and the y-axis represents the fill factor.

The transmittance may be expressed as alphabets on the graph. The transmittance may increase moving toward the bottom-left corner of the graph, generally. An optimized range may be determined based on the extinction ratio of polarization of FIG. 5A and the transmittance of FIG. 5B (the area marked with hatched lines).

Thus, the height H may be about 100 nm to about 200 nm. The fill factor of the wire grid may be about 0.1 to about 0.2.

Figure 6B:
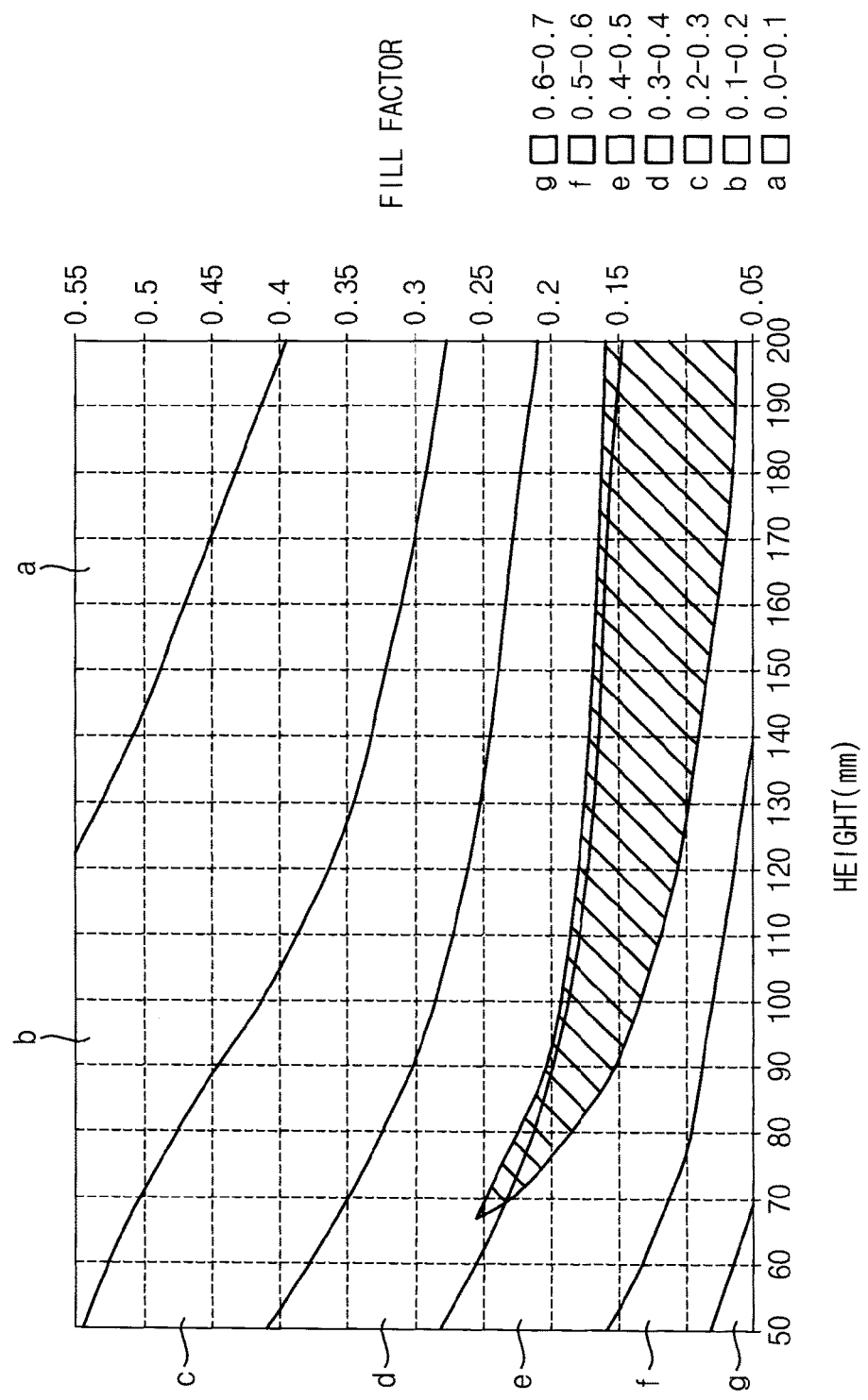

FIGS. 6A and 6B are graphs showing how a fill factor changes with height when optimizing an extinction ratio of polarization and transmittance (hatched line area) in the case where a wire grid of the polarizer of FIG. 2 is formed of tungsten (W). The light supplied to the polarizer in the present example embodiment may have a wavelength of about 255 nm.

Referring to FIG. 6A, the graph represents the extinction ratio of polarization according to fill factor and height.

A metal pattern of the polarizer (reference numeral 120 of FIG. 2) forms a plurality of wire grids extending in a same direction. The wire grid has a height (referring to "H" of FIG. 2) and a width (referring to "L" of FIG. 2). Adjacent wire grids are spaced apart by a separation distance (referring to "S" of FIG. 2). Thus, the metal pattern 120 forms the wire grids having the height H, the width L and a pitch P, which is the sum of the width L and the separation distance S (P=L+S). The metal pattern 120 is formed of tungsten (W).

The pitch P is a sum of the width L and the separation distance S. A fill factor (FF) is a result of dividing the width L by the pitch P (FF=L/P). The pitch P may be determined by taking into account the wavelength of the light that is supplied to the polarizer. For example, when the light has wavelength less than about 300 nm, the pitch P may be less than about 90 nm.

The x-axis represents the height H of the metal pattern 120, and the y-axis represents the fill factor.

The extinction ratios of polarization may be expressed with alphabets on the graph. The extinction ratio of polarization may increase moving toward the upper-right corner of the graph, generally.

Referring to FIG. 6B, the graph represents the transmittance according to the fill factor and the height. The x-axis represents the height H of the metal pattern 120, and the y-axis represents the fill factor.

The transmittance may be expressed as alphabets on the graph. The transmittance may increase toward the bottom-left corner of the graph, generally. An optimized range may be determined based on the extinction ratio of polarization of FIG. 6A and the transmittance of FIG. 6B (the area marked with hatched lines).

Thus, the height H may be about 70 nm to about 200 nm. The fill factor of the wire grid may be about 0.05 to about 0.15.

Figure 7A:
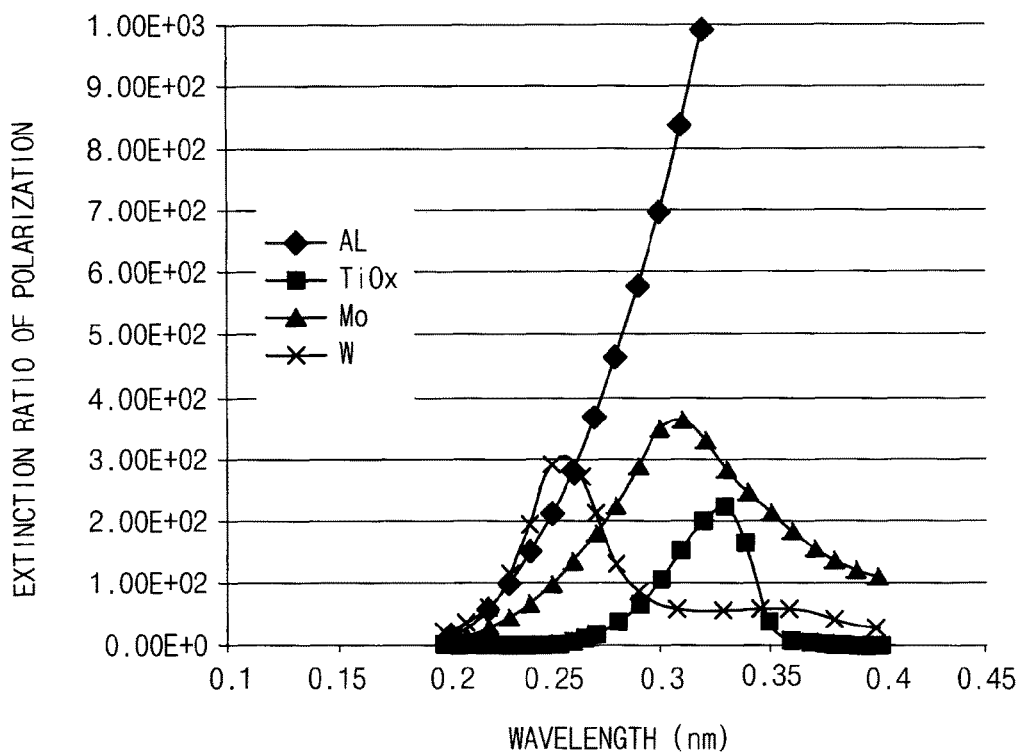
FIGS. 7A and 7B are graphs illustrating an extinction ratio of polarization and transmittance in accordance with materials which form a wire grid of a polarizer.
Figure 7B:
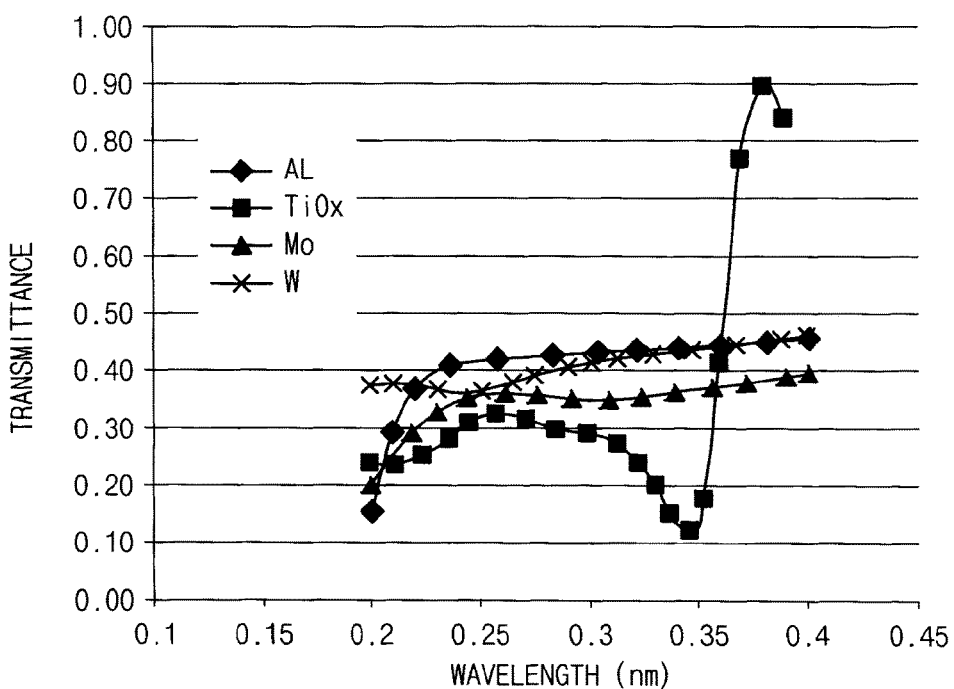

FIGS. 7A and 7B are graphs illustrating the extinction ratio of polarization and the transmittance, respectively, for different materials that form a wire grid of a polarizer.

Referring to FIG. 7A, a graph represents extinction ratio of polarization according to wavelength. The x-axis represents the wavelength of light that is supplied to a polarizer, and the y-axis represents the extinction ratio of polarization.

The graph shows the extinction ratio of polarization according to the wavelength of light that reaches the polarizer when a wire grid of the polarizer is formed of aluminum (Al). In addition, the graph also shows the extinction ratio of polarization according to the wavelength of light that reaches the polarizer when a wire grid of the polarizer is formed of molybdenum (Mo). In addition, the graph also shows the extinction ratio of polarization according to the wavelength of light that reaches the polarizer when a wire grid of the polarizer is formed of tungsten (W). In addition, the graph also shows the extinction ratio of polarization according to the wavelength of light that reaches a traditional polarizer when a wire grid of the traditional polarizer is formed of titanium oxide (TiOx), for comparison with the present example embodiments.

The liquid crystal display apparatus includes an alignment layer that gives a pre-tilt to liquid crystal molecules of a liquid crystal layer. The alignment layer is irradiated with ultraviolet ray from the polarized light illuminating apparatus, so that the pre-tilt may be formed.

The polarized light illuminating apparatus may use light having a wavelength less than about 300 nm. At a wavelength range less than about 300 nm, the extinction ratio of polarization when the wire grid of the polarizer is formed of aluminum (Al), molybdenum (Mo) or tungsten (W) is greater than the extinction ratio of polarization when the wire grid of the polarizer is formed of titanium oxide (TiOx).

Referring to FIG. 7B, a graph represents transmittance as a function of wavelength. The x-axis represents the wavelength of light that supplied to a polarizer, and the y-axis represents the transmittance.

The graph shows the transmittance according to the wavelength of light that reaches the polarizer when a wire grid of the polarizer is formed of aluminum (Al). In addition, the graph also shows the transmittance according to the wavelength of light that reaches the polarizer when a wire grid of the polarizer is formed of molybdenum (Mo). In addition, the graph also shows the transmittance according to the wavelength of light that reaches the polarizer when a wire grid of the polarizer is formed of tungsten (W). In addition, the graph also shows the transmittance according to the wavelength of light which that reaches a traditional polarizer that is formed of titanium oxide (TiOx), for comparison with the present example embodiments.

The liquid crystal display apparatus includes an alignment layer that gives a pre-tilt to liquid crystal molecules of a liquid crystal layer. The alignment layer is irradiated with ultraviolet ray from the polarized light illuminating apparatus, so that the pre-tilt may be formed.

The polarized light illuminating apparatus may use light having a wavelength less than about 300 nm. At a wavelength range less than about 300 nm, the transmittance when the wire grid of the polarizer is formed of aluminum (Al), molybdenum (Mo) or tungsten (W) is greater than the transmittance when the wire grid of the polarizer is formed of titanium oxide (TiOx).

According to the present invention, the polarizer may have optimized extinction ratio of polarization and transmittance.

In addition, the polarized light illuminating apparatus may be used to manufacture a liquid crystal display panel. The polarized light illuminating apparatus uses the polarizer which has improved transmittance, so that manufacturing time and power consumption of the liquid crystal display panel may be decreased.

The foregoing is illustrative of the inventive concept and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the disclosure. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims.

What is claimed is:

1. A polarizer for polarizing a light of a known wavelength, comprising:
    a base substrate; and
    a metal pattern formed of only one of aluminum, molybdenum and tungsten, the metal pattern disposed on the base substrate and forming a wire grid, the wire grid having a width and a height and being spaced apart from an adjacent wire grid by a separation distance, wherein the wire grid has a fill factor that falls within a range that is based on an extinction ratio of polarization and a transmittance of the polarizer, the fill factor being obtained by dividing the width by a pitch, wherein the pitch is a sum of the width and the separation distance,
    wherein the pitch of the wire grid is less than 90 nm,
    wherein the wire grid is a single layer which includes the metal pattern,
    when the metal pattern is only formed of aluminum (Al), then the fill factor is about 0.2 to about 0.4, and the height of the wire grid is about 130 nm to about 200 nm;
    when the metal pattern is only formed of molybdenum (Mo), then the fill factor is about 0.1 to about 0.2, and the height of the wire grid is about 100 nm to 200 nm;
    when the metal pattern is only formed of tungsten (W), then the fill factor is about 0.05 to about 0.15, the height of the wire grid is about 70 nm to about 200 nm.

2. A polarized light illuminating apparatus comprising:
    a light source generating a light having a wavelength less than about 300 nm;
    a light source cover reflecting the light from the light source toward a bottom portion of the light source;
    a work stage disposed under the light source and configured to support a display panel having an alignment layer for photo alignment; and
    a polarizer disposed between the light source and the work stage,
    wherein
    the polarizer comprises:
    a base substrate; and
    a metal pattern formed of only one of aluminum, molybdenum and tungsten, the metal pattern disposed on the base substrate and forming a wire grid, the wire grid having a width and a height and being spaced apart from an adjacent wire grid by a separation distance, wherein the metal pattern has a fill factor within a range that is based on an extinction ratio of polarization and a transmittance of the polarizer, the fill factor being obtained by dividing the width by a pitch, wherein the pitch is defined sum of the width and the separation distance, wherein the wire grid is a single layer which includes the metal pattern, when the metal pattern is only formed of aluminum (Al), then the fill factor is about 0.2 to about 0.4, and the height of the wire grid is about 130 nm to about 200 nm;

when the metal pattern is only formed of molybdenum (Mo), then the fill factor is about 0.1 to about 0.2, and the height of the wire grid is about 100 nm to 200 nm;

when the metal pattern is only formed of tungsten (W), then the fill factor is about 0.05 to about 0.15, the height of the wire grid is about 70 nm to about 200 nm.

3. The polarized light illuminating apparatus of claim 2, wherein the pitch of the wire grid is less than 90 nm.

4. A method of manufacturing a polarizer comprising:
forming a metal layer having a height on a base substrate;
forming a resist layer comprising a grid having a width, a separation distance and a pitch;
partially removing the resist layer to form a resist pattern partially exposing the metal layer;
forming a metal pattern formed of only one of aluminum, molybdenum and tungsten by removing an exposed portion of the metal layer using the resist pattern as a mask; and
removing the resist pattern to form the metal pattern into a wire grid,
wherein the pitch is a sum of the width and the separation distance, the fill factor is obtained by dividing the width by the pitch, and the range of the fill factor is based on an extinction ratio of polarization and a transmittance of the polarizer,
wherein the pitch of the wire grid is less than 90 nm,
wherein the fill factor is about 0.2 to about 0.4 and the height of the wire grid is about 130 nm to about 200 nm when the metal pattern is only formed of aluminum (Al),
the fill factor is about 0.1 to about 0.2 and the height of the wire grid is about 100 nm to 200 nm when the metal pattern is only formed of molybdenum (Mo), and
the fill factor is about 0.05 to about 0.15 and the height of the wire grid is about 70 nm to about 200 nm when the metal pattern is only formed of tungsten (W).

* * * * *